(12) United States Patent
Ganahl (10) Patent No.: US 9,019,386 B2
(45) Date of Patent: Apr. 28, 2015

(54) SWITCHING DEVICE

(75) Inventor: Christian Ganahl, Feldkirch (AT)

(73) Assignee: Neutrik AG, Schaan (LI)

( * ) Notice: Subject to any disclaimer, the term of this patent is extended or adjusted under 35 U.S.C. 154(b) by 280 days.

(21) Appl. No.: 13/434,155

(22) Filed: Mar. 29, 2012

(65) Prior Publication Data

US 2012/0249811 A1   Oct. 4, 2012

(30) Foreign Application Priority Data

Mar. 30, 2011   (DE) .......................... 10 2011 015 587

(51) Int. Cl.
- *H04N 5/225*   (2006.01)
- *H04N 9/04*   (2006.01)
- *H04N 5/268*   (2006.01)
- *H04N 5/232*   (2006.01)

(52) U.S. Cl.
CPC ........... *H04N 5/268* (2013.01); *H04N 5/23206* (2013.01); *H04N 5/23241* (2013.01)

(58) Field of Classification Search
CPC ..... H04N 5/232; H04N 5/23203; H04N 5/63; H04N 5/23206
USPC .................................. 348/705, 706, 730, 159
See application file for complete search history.

(56) References Cited

U.S. PATENT DOCUMENTS

| | | | |
|---|---|---|---|
| 5,247,594 | A | 9/1993 | Okuno et al. |
| 5,592,321 | A | 1/1997 | Elberbaum |
| 6,947,069 | B1 * | 9/2005 | Elberbaum ..................... 348/50 |
| 2005/0134746 | A1 | 6/2005 | Brandt |

FOREIGN PATENT DOCUMENTS

| | | |
|---|---|---|
| DE | 2502734 | 7/1976 |
| DE | 69127607 T2 | 9/1997 |
| DE | 69720635 T2 | 4/2003 |
| DE | 10210443 A1 | 9/2003 |
| EP | 0837605 A2 | 4/1998 |
| EP | 0837605 A3 | 9/1999 |
| EP | 1413912 A1 | 4/2004 |
| EP | 1615453 A1 | 1/2006 |
| EP | 2071829 A1 | 6/2009 |
| JP | 2009212913 A | 9/2009 |

\* cited by examiner

*Primary Examiner* — Jefferey Harold
*Assistant Examiner* — Omer Khalid
(74) *Attorney, Agent, or Firm* — Harris Beach PLLC; Neal L. Slifkin (57) ABSTRACT

Switching device (1) for the alternating connection of at least one television camera (2) to one of at least two television camera control units (3) or for the alternating connection of at least one television camera control unit (3) to one of at least two television cameras (2); with the switching device (1) having connectors (4, 5) for the television camera(s) (2) and the television camera control unit(s) (3); and each connector (4, 5) having electrical supply contacts (6, 7) for the power and voltage supply of the television camera (2) through the television camera control unit (3); and having at least one optical contact (8, 9) for the transmission of information over fiberoptic cables between the television camera (2) and the television camera control unit (3); and with the switching device (1) having at least one power supply line switch (10) and at least one optical switch (11) and at least one switching control unit (12) to actuate the power supply line switch (10) and to actuate the optical switch (11).

10 Claims, 4 Drawing Sheets

SWITCHING DEVICE

This invention relates to a switching device for the alternating connection of at least one television camera with one of at least two television camera control units or for the alternating connection of at least one television camera control unit with least two television cameras, with the switching device having connections for the television camera(s) and the television camera control unit (s) and each connection having power supply contacts for the power and voltage supply of the television camera through the television camera control unit and at least one optical contact for the transmission of information via the fiberoptic cable between television camera and television control unit.

In prior art it is necessary for the operation of a television camera to connect it to a television camera control unit. This connection often occurs through a so-called hybrid cable, e.g., a SMPTE cable, which has at least electrical lines for the power and voltage supply of the television camera and optical fibers for the data transmission between television camera and television camera control unit. Alternatively, the use of separate cables, e.g., one cable for the electrical power and voltage supply and another cable for the optical and/or electrical signal transmission is also possible for the connection of a television camera to a television camera control unit. The television camera control units are usually centrally located in technical rooms or the like, while the television cameras are set up where they are needed, thus, e.g., in various television studios. During television transmissions several television cameras are needed, as a rule, whose set-up is configured before the broadcast. In the process it may happen that specific cameras which are set up at certain locations or specific camera control units are not needed at all for a certain time period or during a specific broadcast. It is also not absolutely necessary for each television camera to have its own television camera control unit, as long as one is able to connect different television cameras with different television camera control units. To enable the connection and changeover, in prior art, switching devices in the form of patch panels are known, where cables can be plugged in at different locations, similar to what was previously the case with telephone exchanges.

This approach, on the one hand, is very costly, and, on the other hand, is prone to errors.

The task of the invention is to propose an improvement.

According to the invention, this is achieved if the switching device has at least one power supply line switch for the alternate connecting of the power supply contacts of the connector for the television camera or one of the connectors for the television cameras with the power supply contacts of the connector for the television camera control unit or one of the connectors for the television camera control unit and at least one optical switch for the alternate connecting of the optical contact of the connector for the television camera or one of the connectors for the television cameras with the optical contact of the connector for the television camera control unit or one of the connectors for the television camera control units and at least one switching control unit to actuate the power supply line switch and to actuate the optical switch.

Because of the invention it is no longer necessary to change cables manually. On the one hand, this constitutes a simplification and, on the other hand, due to the automation, control mechanisms can be built in that prevent improper operation.

If a television camera is operational at the moment, then it must always be connected to precisely one television camera control unit. The television camera obtains the electricity needed for operation via the power supply contacts. The information exchange between television camera and television camera control unit takes place through the optical contacts. Television camera, television camera control unit and the hybrid cable, e.g., the SMPTE cable or separate cables for the connection of the television camera and the television camera control unit to the corresponding connectors of the switching device can be designed as in prior art. They do not have to be explained again here. The innovation refers to the possibility of the alternating connecting of different television camera control units with different television cameras by means of the inventive switching device. The concept of the alternating connection includes not only the switching on or the producing of a connection between a specific camera and a specific camera control unit but also the switching over, during which a television camera is connected to another television camera control unit or a television camera control unit is connected to another television camera. Furthermore, the switching off process also comes under the concept of the alternating connection, thus the separation of a pre-existing connection between a television camera and a television camera control unit.

The minimal set-up, which makes the use of an inventive switching device reasonable, exists if a single television camera is to be alternately connected with at least two television camera control units or a single television camera control unit is to be alternately connected with at least two television cameras via the switching device. In practice, inventive embodiments, however, are frequently designed so that the switching device has several connectors for several television cameras and several connectors for several television camera control units. In principle, however, one television camera is usually connected to only one television camera control unit and, vice versa, one television camera control unit is connected at the same time to only one television camera.

For the sake of completeness, it should be noted that a television camera control unit is a unit that is physically separate or a unit detached from the television camera, which, on the one hand, supplies the television camera with electricity or operating voltage and, on the other hand, also actuates the television camera and forwards or processes further the information or data supplied by the television camera, as known according to prior art.

The number of power supply lines and fiberoptic cables in the hybrid cables or separate cables needed for the connection can vary. The same applies accordingly to the number of power supply contacts and optical contacts of the respective connectors of the switching device for television cameras and television camera control units. As a rule, at least two power supply contacts and at least one optical contact are involved. But there can also be more supply contacts or optical contacts per connector. That ultimately depends on the television camera model and the type of television camera control unit used.

Preferred embodiments of the invention furthermore provide at least one electrical signal contact for the transmission of information via at least one electrical signal line between television camera and television camera control unit for each connector, and the switching device has at least one electrical signal line switch for the alternating connection of the electrical signal contact of the connector for the television camera or one of the connectors for the television cameras to the electrical signal contact of the connector for the television camera control unit or one of the connectors for the television camera control units. Suitable hybrid cables are known or, if there are separate cables, additional cables, television camera models as well as television camera control unit types are also available as needed, which have additional electrical signal lines for the information exchange between television camera and television camera control unit. In these embodiments the invention actuates the switch control unit, then not only the power supply line switch and the optical switch but also the electrical signal line switch. Fortunately, all available supply line switches as well as the signal line switch, if present, and any optical switch are switched simultaneously by the switching control unit if a connection between a specific television camera and a specific television camera control unit is to be created or disconnected or replaced by another connection.

The signal contacts as well as the supply contacts basically involve electrical contacts, which, however, should be differentiated from one another. So the power supply contacts are used to provide the needed electricity and voltage supply for the operation of the television camera. Thus relatively high voltages may be present and relatively large currents may flow. The signal contacts, on the other hand, are used for electrical information transmission so they get by with essentially lower voltages and currents.

Especially preferred embodiments of the invention specify that the switching device has at least one voltage measurement unit to measure the electrical voltage present between the power supply contacts of the connector or one of the connectors, preferably for the television camera control unit or one of the television camera control units and/or at least one current measurement unit to measure the electrical current flowing over at least one of the power supply contacts of the connector or one of the connectors, preferably for the television camera control unit or one of the television camera control units. On the one hand, the operational safety can be increases as a result; on the other hand, improper operation or inadvertent operating errors can also be prevented. With the voltage measurement unit and/or the current measurement unit it is possible to have the switching device, when it receives a switching command, initially check which voltages are present at the power supply contacts and/or which currents are flowing at present over at least one of the power supply contacts. Thus, e.g., the accidental disconnection of a connection between a certain television camera and a certain television camera control unit that is needed at the moment while the connection is still in operation can be prevented. Furthermore, however, it is also possible to allow switching processes of the power supply line switch and/or of the optical switch and/or the available electrical signal line switch, if present, only when the voltage present at the power supply contacts and/or the currents flowing over at least one of the power supply contacts meet specific requirements. As a result, it is possible to ensure that said switches, and particularly the supply line switch, are or will be switched only under such circumstances when the currents flowing over the contact at the moment and/or present at the contact fulfill specific conditions. This can particularly ensure that said switches are switched only when they are in a voltage-free and current-free state or are switched during states when the voltages and/or currents are so low that it no overloading of the supply line switch occurs during the switching. As a result, it is possible to use considerably smaller and cheaper switches. Then the switches no longer have to be designed for switching processes with high currents and/or voltages. The tap of the voltage and/or currents using a voltage measurement unit and/or a current measurement unit can be done directly at the power supply contacts of the connector(s) for the television camera control unit or television camera control units. However, a tap at another suitable location inside the switching device is also possible.

Generally speaking, it is advantageous to have the switching control unit be connected to either the voltage measurement unit and/or the current measuring device to assess the measurement values and to have it feature an initial operating mode, in which it allows the switching on and/or switching over and/or switching off of the power supply line switch and the optical switch and the electrical signal line switch, if present, and have it feature at least an additional operating mode, in which it prevents the switching on and/or switching over and/or switching off of the power supply line switch and the optical switch and the electrical signal line switch, if present.

In an initial embodiment it is possible to do a pure voltage assessment. During this, provision can be made, e.g., for the switching control unit to be in the initial operating mode when the electrical voltage being measured by the voltage measurement unit, preferably momentarily, is at or below the voltage limit value, and to be in the other operating mode when the electrical voltage being measured by the voltage measurement unit, preferably momentarily, is above the voltage limit value. A process for the operation of such a switching device allows the switching control device then to switch on and/or switch over and/or switch off the power supply line switch and the optical switch and the electrical signal line switch, if present, only when the electrical voltage being measured by the voltage measurement unit, preferably momentarily, is at or below the voltage limit value; said switching processes of the switching control unit are not allowed then when the electrical voltage being measured by the voltage measurement unit, preferably momentarily, is above the voltage limit value.

In another embodiment, not only voltage but also current are used for the decision as to whether or not to allow switching processes. In such embodiments it is advantageously provided that the switching control unit is in the initial operating mode when a value pair, consisting of the electrical voltage measured, preferably momentarily, by the voltage measurement unit and the electrical current measured, preferably momentarily, by the current measurement unit are within an allowed voltage-current range and is in another operating mode if this value pair is outside the allowed voltage-current range. If the value pair is at precisely the limit values determined for the voltage-current range, then, for example, this can be equated with a value pair within the voltage-current range. This embodiment thus provides for a process for operating the switching device so that the switching control device is permitted to switch on and/or switch over and/or switch off the power supply line switch and the optical switch and the electrical signal line switch, if present, when the value pair, consisting of the electrical voltage measured, preferably momentarily, by the voltage measurement unit and the electrical current measured, preferably momentarily, by the current measurement unit are within an allowed voltage-current range; said switching processes of the switching control device are not permitted when this value pair is outside the allowed voltage-current range.

The voltage-current range in this embodiment can be defined by appropriate voltage and current limit values or threshold values. These threshold or limit values for voltage and/or current can be predetermined in all of said embodiments or can also be adjustable. A combination of said measures is also possible, with the switching control unit using not only the voltage limit value but also the voltage-current range to assess and decide whether or not to allow switching processes.

There are various possibilities for inputting switching commands into the switching device or its switching control unit. Thus the switching device itself can have at least one manual input device to input commands to switch on and/or switch over and/or switch off by hand. These can be buttons, keypads, touchpads, toggle switches and all possible other input devices known from prior art. These manual input devices can be integrated into a housing of the switching device directly accessible from the outside.

To enable the activation of the switching device and thus also the switching control unit from a remote position, at least one interface for inputting the commands to switch on and/or switch over and/or switch off can be provided for the switching device by means of an external input device. Basically all cable-based or cable-free types of remote control known to prior art come under consideration here. The external input device can be a data processing device such as a personal computer or a laptop or a mobile telephone or the like. In this regard, said interface of the switching device advantageously involves a standardized interface for the connection of standard cables or a wireless standard interface such as Bluetooth, radio or infrared. In particular, the possibility of external actuation via the interface by means of its connection to a computer and/or telephone network, for example, via an intranet or the Internet or via a LAN or WLAN connection should be mentioned.

With regard to a compact design, the inventive switching device is advantageously designed in the form of a single, coherent switch box. In this regard, it is advantageous then if the switching device has a housing and the power supply line switch and the optical switch and also the electrical signal line switch, if present, and the switching control unit are arranged inside the housing, and the connectors as well as the manual input device and/or the interface, if present, are accessible from the outside of the housing.

Advantageously, the switching device has a display option which shows the user whether or not a switching process is possible at the moment. Furthermore, a display can also be provided that displays the connections switched between television cameras and television camera control units or other operating states or parameters at the moment. These displays can be made e.g., in the form of LED displays, small-screen devices and the like directly on the housing of the switching device. However, it is just as possible to display all of these via said interface of the switching device on said external input device.

For the sake of completeness, it should be noted that, in terms of an integrated design of the connectors present on the switching device, it is advantageously provided that each connection is designed as a single connector socket or as a single connector plug with all the contacts needed to connect to a television camera or a television camera control unit. The underlying idea to realize all of the electrical and optical contacts needed to connect to a television camera or a television camera control unit in the form of an integrated or single connector plug or in the form of a correspondingly integrated, single connector socket. This is appropriate then if all of the connecting lines needed to connect a television camera and a television camera control unit are combined into a single hybrid cable. If, instead of a single hybrid cable, two or several separate cables are used to connect the television camera with the television camera control unit, then the contacts of an individual connector of the switching device should naturally also be arranged in corresponding separate plugs or sockets which allow the connection of these separate cables.

Additional features and details of preferred embodiments of this invention are explained using the following figures to describe them. Shown are.

Figure 1:
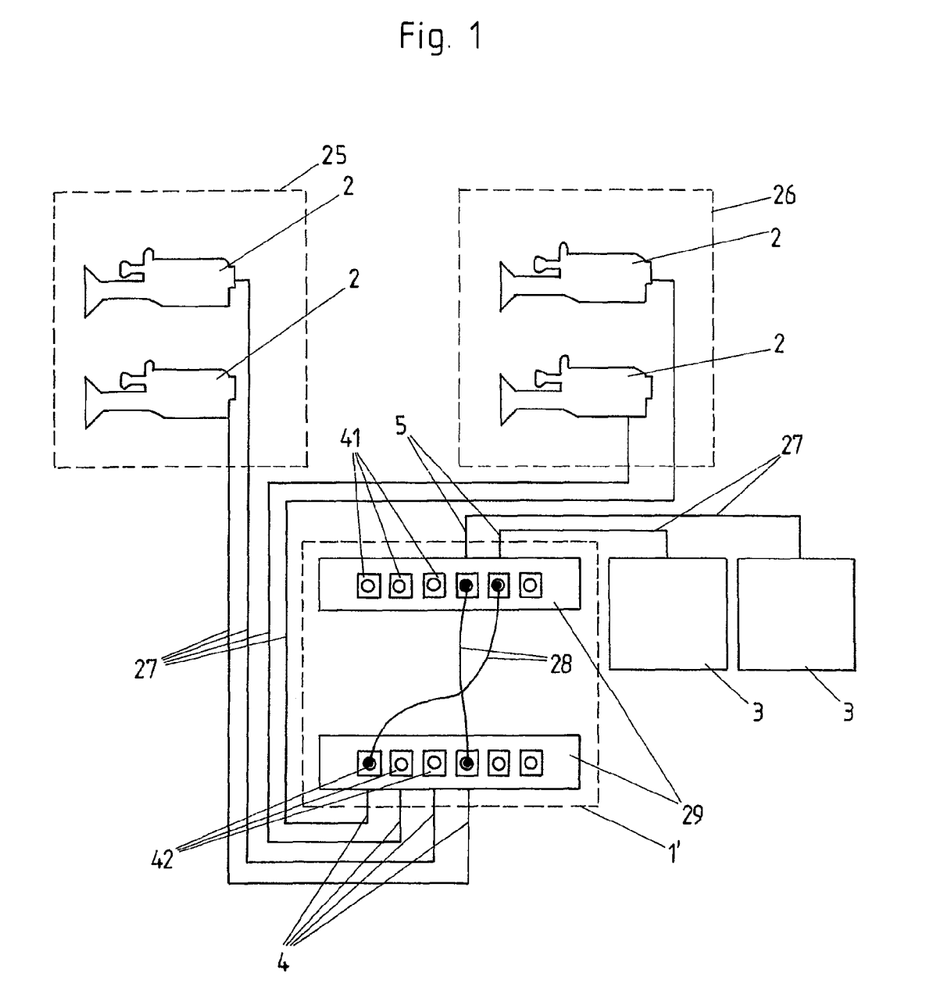
FIG. 1 a prior art representation.

FIG. 1 shows an example of a configuration in which four television cameras 2 in two different studios 25 and 26 are operated. Only two television camera control units 3 are provided for the operation of these four television cameras 2 in the example of an embodiment shown. Since a television camera 2 during operation must always be connected to exactly one television camera control unit 3 and vice-versa, the configuration represented according to FIG. 1 can operate only two of the four television cameras 2 at the same time. As a result, it is necessary to switch the connection between the television cameras 2 and the television camera control units 3, which, according to prior art, is made possible by the switching device 1' presented in the form of patch panels. This switching device 1' according to prior art, has four connectors 4 for the television cameras 2 and two connectors 5 for the television camera control units 3. The connectors 4 for the television cameras 2 are all on an initial connector board 29 or patch panel of the switching device 1'. The connectors 5 for the television camera control units 3 are on a second connector board 29 or patch panel of the switching device 1'. The corresponding connectors 4 are connected via the well known hybrid cables 27 with the television cameras 2. The connectors 5 are connected via the well known hybrid cables 27 with the television camera control units 3. The hybrid cables 27 are comprised not only of power supply lines to the voltage and current supply of the television cameras 2 but also to at least one or more optical signal lines in the form of fiberoptic cables. Furthermore, the hybrid cables 27 usually also include electrical signal lines.

The optical lines and the electrical signal lines are used for the information exchange between television camera 2 and television camera control unit 3. The power supply lines are used for the current and voltage supply of the television camera 2 through the television camera control unit 3. The connectors 4 and 5 of the switching device 1 have a corresponding number of power supply contacts 4 and 5, optical contacts 8 and 9 and electrical signal contacts 15 and 16, not presented here in detail.

In prior art, a desired switching on, over and off process is carried out manually, with the desired connection between one of the television camera control units 3 and one of the television cameras 2 being produced or disconnected by means of switching cable 28. The appropriate plugs of the switching cable 28 are inserted by hand into the corresponding sockets 41 and 42 of the connector boards or patch panels 29. This is, on the one hand, costly and, on the other hand, also prone to errors.

Figure 2:
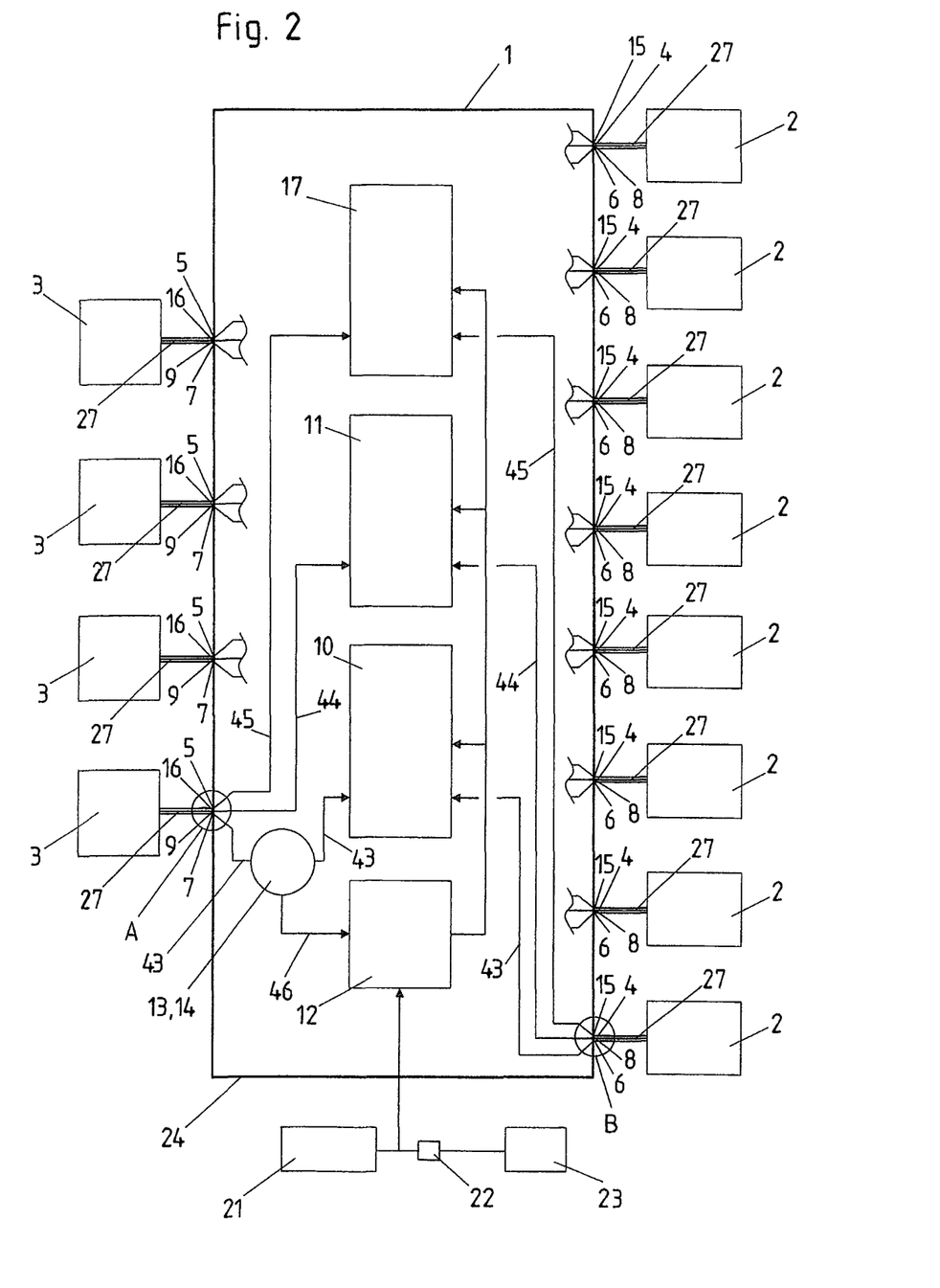
FIG. 2 a schematic representation of an inventive example of an embodiment.

To avoid the necessity of the manual switching over, the invention provides a switching device 1, an example of which is drawn schematically in FIG. 2. In this switching device the switching on, over and off processes are carried out by means of the switching control unit 12, the supply line switch 10 and the optical switch 11 as well as also by means of the electrical signal line switch 17. All of these said switches 10, 11, 17 are controlled by the switching control unit 12. This is connected, on the one hand, with the voltage measurement unit 13 and current measurement unit 14 integrated here in the design. On the other hand, the switching control unit 12 receives switchover commands either from the manual input device 21 or the interface 22 and the external input device 23. Naturally, the manual input device 21 and interface 22 can also both be realized in the switching device 1. The different embodiments of the manual input device 21 as well as the interface 22 and the external input device 23 were explained at the beginning. In the switching control unit 12 it may involve a suitable microprocessor or the like. Also the voltage measurement unit and current measurement unit 13 and 14 can be integrated or separate in very different embodiments, as known in prior art.

The same applies also to the power supply line switch 10, the optical switch 11 and the electrical signal line switch 17. For the electrical switches 10 and 17 there are suitable switching relays and electronic circuits known in prior art. Suitable optical switches 11 are also known. Reference is made, for example, to EP 1 413 912 A1 and U.S. Pat. No. 5,247,594 A.

In the embodiment example shown, the switching device 1 has a total of four connectors 5 for television camera control units 3. In the configuration represented, an appropriate television camera control unit 3, as known in prior art, is attached to each of these connectors 5 via an appropriate hybrid cable 27, e.g., a SMPTE cable, as known in prior art. Furthermore, the embodiment example shown of the inventive switching device 1 has a total of 8 connectors 4 for a total of eight television cameras 2, which also are connected via the known hybrid cables 27 to the corresponding connectors 4 of the switching device 1. The connectors 4 and 5 are each advantageously executed in the form of integrated plugs or sockets, as mentioned at the beginning, and are advantageously outside the housing 24 of the switching device 1. If, on the other hand, the connections between television camera and television camera control unit can be achieved by separate cables, then the individual connectors 4 and 5 should also in be executed in correspondingly suitably executed separate plugs or sockets. Also the manual input device 21, the interface 22 as well as the display devices, present but not represented here, are advantageously also attached outside the housing 24.

Inside the housing 24 in the embodiment example shown, there are the switching control unit 12 as well as the power supply line switch 10, the optical switch 11 and the electrical signal line switch 17 as well as the corresponding wiring with the connectors 4 and 5. This wiring inside the switching device 1, shown in the embodiment example of FIG. 2, is, for the sake of clarity, represented to a simplified or limited extent. FIG. 2, for example, shows only the connection between one of the connectors 5 and one of the connectors 4 with the three switches 10, 11 and 17 placed in-between. In reality, the other connectors 4 and 5 are connected in the same way to the switches 10, 11 and 17 as well as to the switching control unit 12.

Also the power supply lines 43, optical lines 44 and electrical signal lines 45 delineated inside the switching device 1 are only represented in a schematic and simplified manner. This also applies to the current and voltage signal lines 46. In reality, it usually involves at least two power supply lines, one or more optical signal lines 44 and also one or more electrical signal lines 45, for each connection 4 and/or connection 5. Also the current and voltage signal lines are usually executed as separate lines. The voltage measurement unit 13, as a rule, measures the voltage between two power supply lines 43 or the assigned power supply contacts 6 and 7. This measurement is done advantageously as close as possible or directly at the connection 5 to the respective television camera control unit 3. The current measurement is done via at least one of the power supply lines 43 or at one of the power supply contacts 6 and 7.

As explained already at the beginning, the switching control unit 12 receives a command via the manual input device 21 and/or the interface 22 to switch a connection between one of the television camera control units 3 and one of the television cameras 2 on, over or off. Before the switching control unit passes appropriate switching commands on to the power supply line switch 10, the optical switch 11 and the electrical signal line switch 17, it first requests the measurement values from the respective voltage measurement units 1 and/or current measurement units 14 and decides then, using the criteria explained below as examples, in which operating mode it is and thus whether or not the desired switching process will be carried out. If the requested voltage and/or current values are within the allowed criteria, then the switching control unit 12 is in its initial operating mode in which it permits a corresponding switching process. If the requested voltage and/or current measurement values are outside the specified criteria, then the switching control unit 12 is in its other operating mode in which it prevents the desired switching process. As a result, as already explained, the accidental execution of a switching process or the execution of a switching process at voltages or currents that could lead to damage of the power supply line switch 10 can be prevented. Because of this safeguard, it is possible to use relatively compact and affordable power supply line switches 10.

Figure 3:
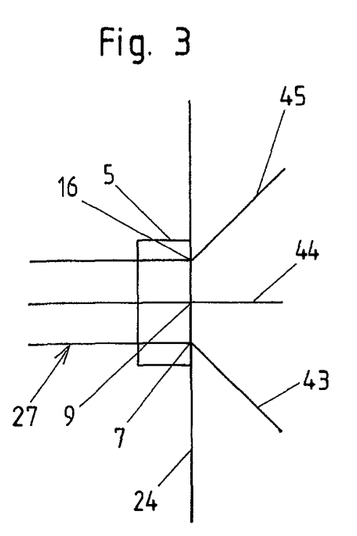
FIG. 3 detail A from FIG. 2.
Figure 4:
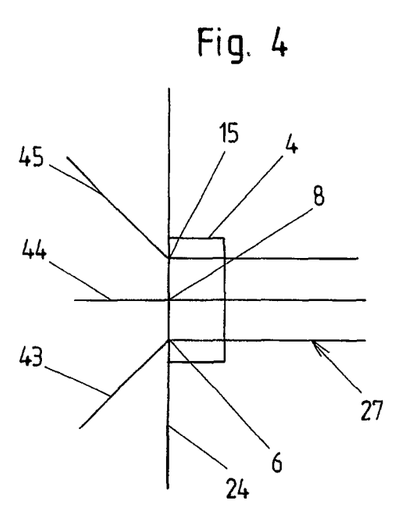
FIG. 4 detail B from FIG. 2.

FIG. 3 shows an enlargement of the schematically represented area A from FIG. 2, in which a connector 5 for a television camera control unit 3 or its hybrid cables 27 are depicted. The connection 5 is integrated into the design; it includes here, in the form of a connector socket, all of the power supply contacts 7, optical contacts 9 and electrical signal contacts 16 needed for the connection of a hybrid cable 27 or a television camera control unit 3. There are an appropriate number of power supply contacts 7, optical contacts 9 and electrical signal contacts 16, so the selected type of television camera control unit 3 matches the hybrid cables 27. The same applies to the in FIG. 4 enlargement shown of area B with one of the connectors 4 for the television camera 2 or its hybrid cables 27.

Figure 5:
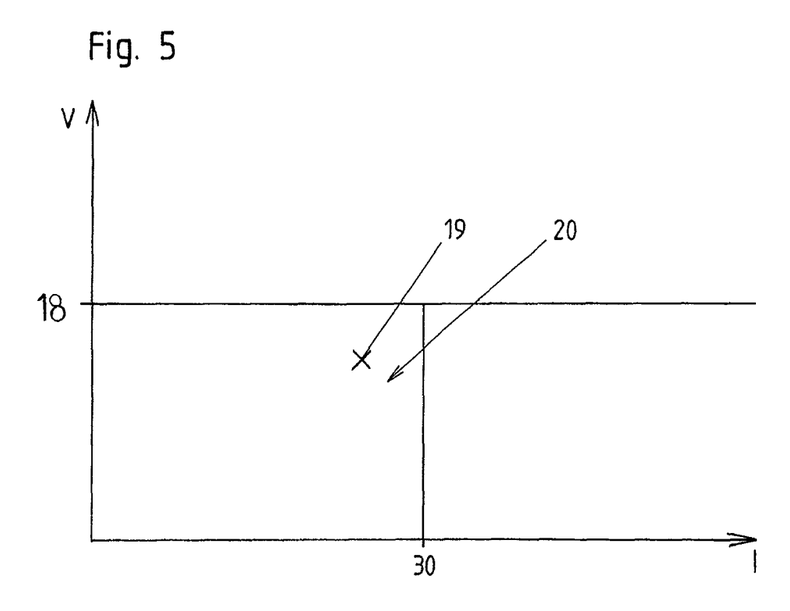
FIG. 5 a representation of the limit values or voltage-current ranges.

In FIG. 5 is a schematic representation of possible decision-making parameters in the form of a voltage-current (V-I) diagram. 18 shows schematically a voltage limit value. With its help, the switching control unit 12 can, e.g., decide whether or not the momentarily measured voltage value of the voltage measurement unit 13 permits a connection of a television camera 2 to a television camera control unit 3. If the measured voltage value is above the voltage limit value 18, then the desired switching process is not allowed; if it is at or under the limit value, then, if an appropriate external switching command is present, the switching control unit 12 actuates the power supply line switch 10, the optical switch 11 and the electrical signal line switch 17 so that the desired connection between the respective television camera 2 and the respective television camera control unit 3 is produced.

Notwithstanding, it is also possible to use the voltage and current for an assessment. Then a voltage current range 20 can be defined by means of an appropriate voltage limit value 18 and an appropriate current limit value 30;

the corresponding value pairs 19 must be from the voltage and current values measured by means of the voltage measurement unit 13 and current measurement unit 14 so the switching control unit 12 can permit or execute a corresponding switching command inputted via the interface 22 or the manual input device 21. If the value pair 19 from the measured voltage and measured current is outside this allowed voltage-current range 20, then said switching command is not executed by the switching control unit 12. The required voltage limit value 18 and/or current limit value 30 can be predetermined but can also be adjustable.

Figure 6:
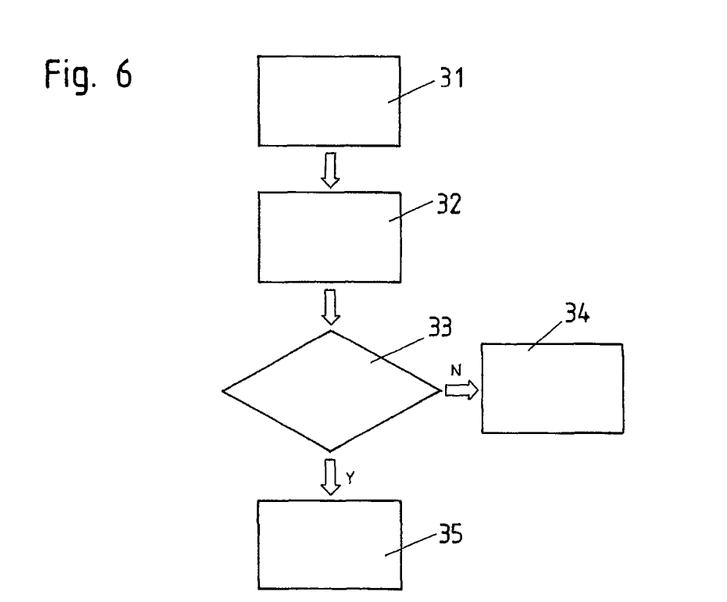
FIG. 6 first flow diagram.

FIG. 6 shows an example of another decision-making diagram for an initial embodiment of the query depicted. Thus the switching control unit 2 in the step 31 receives the command from outside to connect a certain television camera 2 to a certain television camera control unit 3. It is thus a kind of switching-on command 31. In the next step the voltage query 32 to the voltage measurement unit 13 occurs. In the decision-making step 33 the switching control unit 12 decides whether it will allow the desired switching process by comparing the measurement value of the voltage measurement unit 13 with the voltage limit value 18. If the measured voltage value is below or at the voltage limit value 18, then in the step 35 the desired switching-on process takes place. If this criterion is not met, then a negative decision 34 occurs. Then the switching process is not carried out. An appropriate warning can be issued optically, acoustically or otherwise, if applicable.

Figure 7:
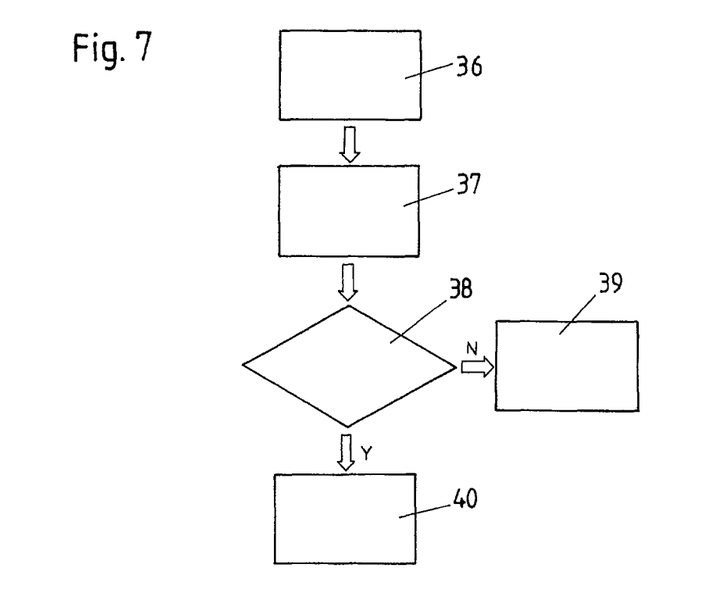
FIG. 7 a second flow diagram.

FIG. 7 shows a flow diagram for disconnecting the connection between a television camera 2 and a television camera control unit 3, thus a switching-off process. The information sign 36 symbolizes the switching-off command to disconnect the connection between the television camera control unit 3 and the television camera 2. In the step 37 the current and voltage query to the current measurement unit 14 and the voltage measurement unit 13 takes place. Using these requested measurement values and the resulting value pair 19, the switching control unit 12 then checks to see if the value pair 19 is in the allowed voltage-current range 20 or not. If the value pair 19 is in this allowed voltage-current range 20, then, under item 40, the desired switching-off process occurs, thus the disconnection of the television camera 2 from the television camera control unit 3 through a switching over of the power supply line switch 10, the optical switch 11 and the electrical signal line switch 17. If the measured value pair 19 is outside the allowed voltage-current range 20, then the switching-off command 36 is not carried out. Thus the negative decision 39 occurs, which again can be accompanied by an appropriate warning signal.

For a switching-over process, thus, e.g., for connecting a television camera control unit 3 to another television camera 2, the switching-off process can first take place according to the sequence in FIG. 7 and then the switching-on process can occur according to the flow diagram in FIG. 6.

| Legend for the reference numbers: | |
|---|---|
| 1, 1' | Switching device |
| 2 | Television camera |
| 3 | Television camera control unit |
| 4 | Connection |
| 5 | Connection |
| 6 | Power supply contact |
| 7 | Power supply contact |
| 8 | Optical contact |
| 9 | Optical contact |
| 10 | Power supply line switch |
| 11 | Optical switch |
| 12 | Switching control unit |
| 13 | Voltage measurement unit |
| 14 | Current measurement unit |
| 15 | Electrical signal contact |
| 16 | Electrical signal contact |
| 17 | Electrical signal line switch |
| 18 | Voltage limit value |
| 19 | Value pair |
| 20 | Voltage-current range |
| 21 | Manual input device |
| 22 | Interface |
| 23 | External input device |
| 24 | Housing |
| 25 | Studio |
| 26 | Studio |
| 27 | Hybrid cables |
| 28 | Switching cable |
| 29 | Connector board |
| 30 | Current limit value |
| 31 | Switching-on command |
| 32 | Voltage query |
| 33 | Decision |
| 34 | Negative decision |
| 35 | Switching-on process |
| 36 | Switching-off command |
| 37 | Current and voltage query |
| 38 | Decision |
| 39 | Negative decision |
| 40 | Switching-off process |
| 41 | Socket |
| 42 | Socket |
| 43 | Power supply line |
| 44 | Optical signal line |
| 45 | Electrical signal line |
| 46 | Current and voltage signal line |

The invention claimed is:

1. A switching device (1) for alternating connection of at least one television camera (2) to one of at least two television camera control units (3) or for the alternating connection of at least one television camera control unit (3) to one of at least two television cameras (2), with the switching device (1) comprising:
   connectors (4, 5) for the television camera(s) (2) and the television camera control unit(s) (3) and each connector (4, 5) comprising:
      power supply contacts (6, 7) for the power and voltage supply of the television camera (2) by the television camera control unit (3), and
      at least one optical contact (8, 9) for transmission of information over fiberoptic cables between the television camera (2) and the television camera control unit (3), and
   at least one power supply line switch (10) for the alternating connection of the power supply contacts (6) of the connector (4) for the television camera (2) or one of the connectors (4) for the television cameras (2) with the power supply contacts (7) of the connector (5) for the television camera control unit (3) or one of the connectors (5) for the television camera control units (3); and
   at least one optical switch (11) for the alternating connection of the optical contacts (8) of the connector (4) for the television camera (2) or one of the connectors (4) for the television cameras (2) with the optical contact (9) of the connector (5) for the television camera control unit (3) or one of the connectors (5) for the television camera control units (3); and
   at least one switching control unit (12) communicatively coupled to both of said at least one power supply line switch (10) and said at least one optical switch (11) to actuate the power supply line switch (10) and to actuate the optical switch (11).

2. Switching device (1) according to claim 1 wherein the switching device (1) has at least one voltage measurement unit (13) to measure the electrical voltage present between the power supply contacts (6, 7) of the connector (4, 5) or one of the connectors (4, 5), preferably for the television camera control unit (3) or one of the television camera control units (3), and/or at least one current measurement unit (14) to measure the electrical current flowing over at least one of the power supply contacts (6,7) of the connector (4, 5) or one of the connectors (4, 5), preferably for the television camera control unit (3) or one of the television camera control units (3).

3. Switching device (1) according to claim 1 wherein each connector (4, 5) has in addition at least one electrical signal contact (15, 16) for the transmission of information via at least one electrical signal line between television camera (2) and television camera control unit (3), and the switching device (1) has at least one electrical signal line switch (17) for the alternating connection of the electrical signal contact (15) of the connector for the television camera (2) or one of the connectors (4) for the television cameras (2) with the electrical signal contact (16) of the connector (5) for the television camera control unit (3) or one of the connectors (5) for the television camera control units (3).

4. Switching device (1) according to claim 2 wherein the switching control unit (12) is connected to the voltage measurement unit (13) and/or the current measurement unit (14) to assess the measurement values and has an initial operating mode, in which it allows the switching on and/or switching over and/or switching of the power supply line switch (10) and the optical switch (11) and the electrical signal line switch (17), if present; it has at least one additional operating mode, in which it prevents the switching on and/or switching over and/or switching off of the power supply line switch (10) and the optical switch (11) and the electrical signal line switch (17), if present.

5. Switching device (1) according to claim 4, wherein the switching control unit (12) is in the initial operating mode when the electrical voltage being measured by the voltage measurement unit (13), preferably momentarily, is at a voltage limit value (18) or below a voltage limit value (18) and is in the additional operating mode when the electrical voltage being measured by the voltage measurement unit (13), preferably momentarily, is above the voltage limit value (18).

6. Switching device (1) according to claim 4 wherein the switching control unit (12) is in the initial operating mode when a value pair (19), consisting of the electrical voltage measured, preferably momentarily, by the voltage measurement unit (13) and the electrical current measured, preferably momentarily, by the current measurement unit (14) are within an allowed voltage-current range (20) and in another operating mode if this value pair (19) is outside the allowed voltage-current range (20).

7. Switching device (1) according to claim 1 wherein the switching device (1) has at least one manual input device (21) to input commands to switch on and/or switch over and/or switch off by hand and/or at least one interface (22) for inputting the commands to switch on and/or switch over and/or switch off provided by means of an external input device (23).

8. Switching device (1) according to claim 1 wherein each connector (4, 5) is designed as a single connector socket or as a single connector plug and has all the contacts (6, 7, 8, 9, 15, 16) needed to connect to a television camera (2) or a television camera control unit (3).

9. Switching device (1) according to claim 1 wherein the switching device (1) has several connectors (4) for several television cameras (2) and several connectors (5) for several television camera control units (3).

10. Switching device (1) according to claim 1 wherein the switching device (1) has a housing (24) and the power supply line switch (10) and the optical switch (11) as well as the electrical signal line switch (17), if present, and the switching control unit (12) are arranged inside the housing (24), and the connectors (4, 5) as well as the manual input device (21) and/or the interface (22), if present, are arranged so that they are accessible from the outside of the housing (24).

* * * * *